Dec. 13, 1960     K. A. KLINGLER     2,964,343
GASKET ASSEMBLY
Filed June 23, 1958     2 Sheets-Sheet 1
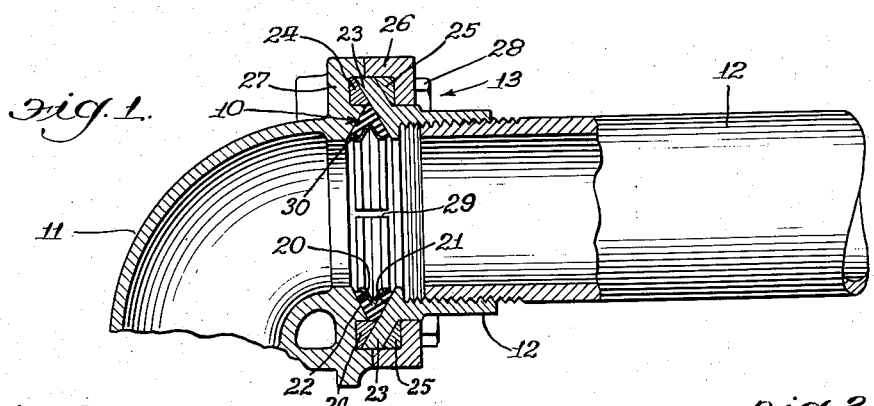
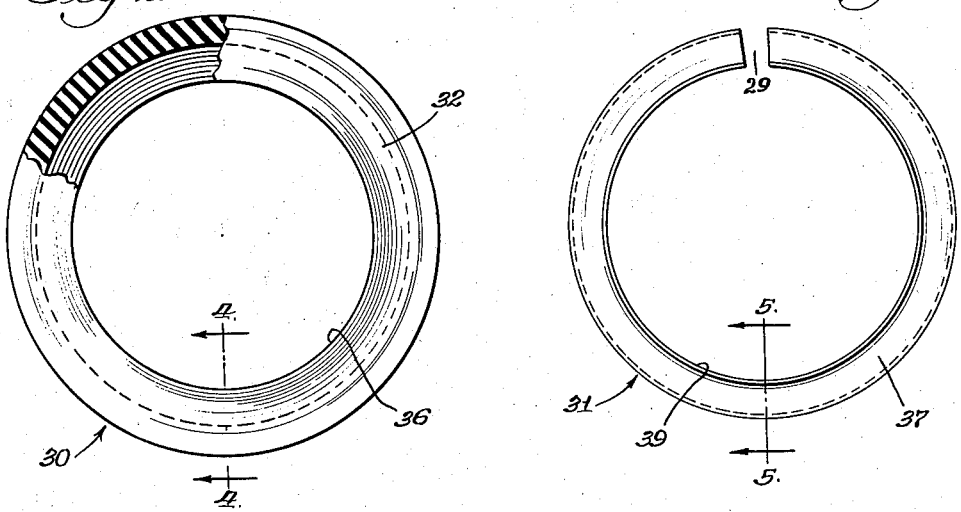
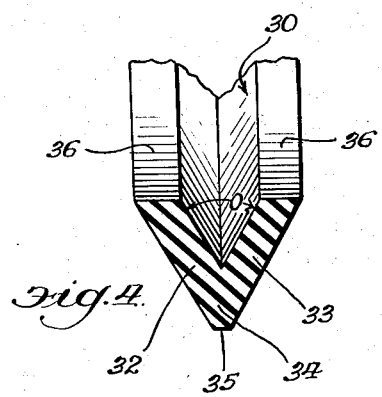
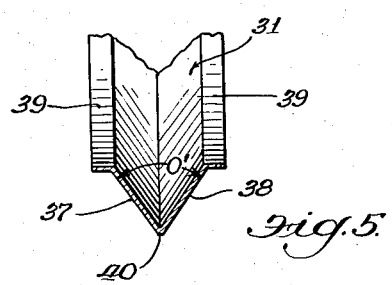
INVENTOR.
Karl A. Klingler
BY
Harvey M. Gillespie
Atty.

Dec. 13, 1960   K. A. KLINGLER   2,964,343
GASKET ASSEMBLY
Filed June 23, 1958   2 Sheets-Sheet 2
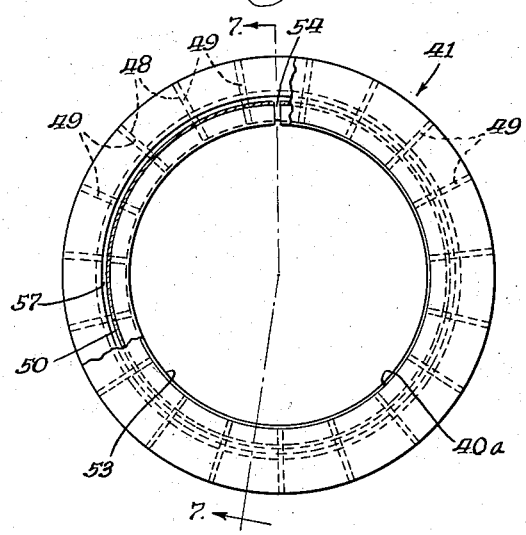
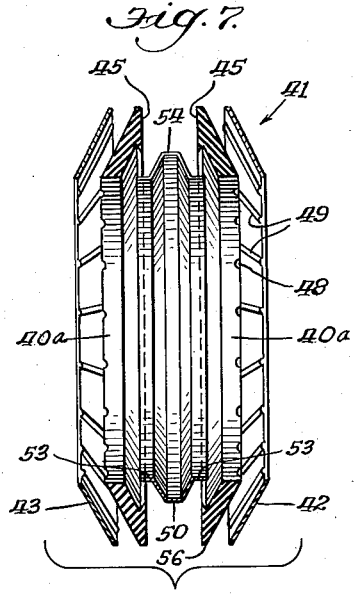
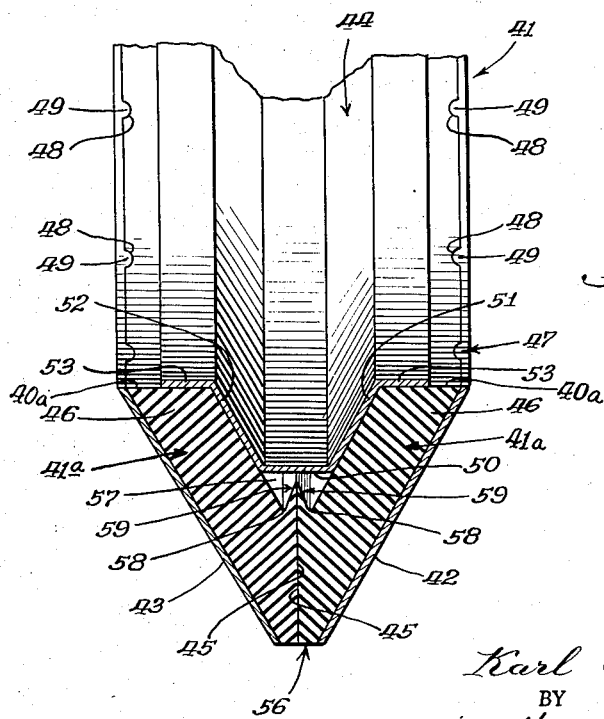
INVENTOR.
Karl A. Klingler
BY
Harvey M. Gillespie
Atty.

United States Patent Office 2,964,343
Patented Dec. 13, 1960

2,964,343

GASKET ASSEMBLY

Karl A. Klingler, 111 S. Wright St., Naperville, Ill.

Filed June 23, 1958, Ser. No. 743,678

10 Claims. (Cl. 288—27)

The present invention relates to new and useful improvements in gaskets and has particular reference to a novel form of composite gasket assembly designed for use in producing either a static or a running seal at the juncture or joint between the adjacent ends of two communicating fluid conduits.

Gasket assemblies constructed in accordance with the principles of the present invention will be found particularly useful in connection with flexible conduit assemblies of the type which are employed for maintaining continuity of a steam train line through the various car units of a railway train. Such flexible conduit assemblies invariably consist of rigid metallic conduit sections which are flexibly articulated at the joints where communication is established between them and, when put to such use, the gasket assembly of the present invention affords a running seal with one or both of a pair of seat surfaces provided on the two opposed rim portions of the communicating conduit sections so that the necessary articulation between the sections may be attained. The invention is, however, capable of many other uses, whether the joints involved be articulated or static joints and, where static joints are concerned, the gasket of the present invention will make static or stationary sealing contact with the seat surfaces provided on the rim portions of the communicating conduits. Irrespective however of the particular use to which the present invention may be put, the essential features thereof are at all times preserved.

The sealing gasket of the present invention is comprised of at least two separate parts including a resilient gasket proper which is hollow and of generally V-shape in radial cross-section. This gasket is adapted to fit snugly within an annular V-shaped channel or recess afforded by virtue of the provision of a pair of opposed inclined seat surfaces provided on the opposed rim portions respectively of two communicating conduits with the nose or apex of the V-shaped gasket extending into the void or "crevice" afforded between the region where the seat surfaces approach each other. Novel means are provided for spreading the side walls of the V-shaped gasket laterally into firm sealing engagement with the seat surfaces with pressure being applied evenly over the seat surfaces and the arrangement of the gasket in its environment is such that this sealing action is enhanced by the internal pressure of fluid within the joint. The aforementioned spreading means whereby the side walls are forced apart is also effective to apply radial and circumferential expansion to the gasket as a whole so that large tolerance may be maintained in the manufacture of the gasket. Additionally, such spreading means is a factor in rendering the gasket useable in connection with conduits which may be slightly out-of-round or otherwise deformed. Finally, the spreading means referred to above is effective as a shield to protect the gasket proper from contact with live steam, in the case of its use in connection with train lines, for example, or from the deleterious action of corrosive fluids.

The provision of a gasket assembly of the character briefly outlined above being among the principal objects of the present invention, numerous other objects and advantages will appear as the following description ensues.

In the accompanying drawings, forming a part of this specification, certain preferred embodiments of the invention have been illustrated.

In these drawings:

Fig. 1 is a fragmentary side elevational view, partly in central longitudinal section, of a flexible conduit joint employing a gasket assembly constructed in accordance with the principles of the present invention;

Fig. 2 is a plan view, partly in section, of an elastomeric gasket proper which forms one element of the present gasket assembly;

Fig. 3 is a plan view of a reinforcing and spreading ring employed in the present gasket assembly;

Fig. 4 is an enlarged sectional view taken substantially along the line 4—4 of Fig. 2;

Fig. 5 is an enlarged sectional view taken substantially along the line 5—5 of Fig. 3;

Fig. 6 is a view similar to Fig. 2 but illustrating a modified form of gasket assembly;

Fig. 7 is a sectional view taken on line 7—7 of Fig. 6 but showing the several parts of the assembly separated from each other; and Fig. 8 is a fragmentary enlarged view of the several elements of Fig. 7 moved into their normal assembled relation.

Referring now to the drawings in detail and in particular to Fig. 1, the gasket assembly of the present invention has been designated in its entirety at 10 and it is shown in a typical environment which may be one of the joints associated with a flexible conduit assembly extending between the end valves of adjacent railway cars in a railway train. The conduit assembly includes an elbow section 11 and a straight conduit section 12 operatively connected thereto by an articulated joint 13 including the gasket assembly 10 and by means of which the two sections may be rotated relative to each other about the axis of the joint.

The particular joint 13 illustrated herein is purely exemplary and the gasket assembly 10 may be employed, with or without modification, in other forms of joints if desired. The joint 13 forms no part of the present invention and no claim is made herein to any novelty associated with the same. Such a joint has been shown and described in my copending application Serial No. 743,599, filed June 23, 1958, for Flexible Conduit Joint Structure, and reference may be had to such application for a detailed description thereof. For purposes of description herein it is deemed sufficient to state that the joint embodies a frusto-conical sealing surface 20 on the rim portion of the conduit section 11 and a frusto-conical sealing surface 21 on the rim portion of the conduit section 12. The surfaces 20 and 21 extend at an angle to each other and provide, in effect, an annular V-shaped circumferential trough or groove 22 of V-shape in radial cross-section and within which groove the gasket assembly 10 is seated. The surfaces 20 and 21 are slightly spaced from each other at the bottom of the groove and the surface 21 continues outwardly beyond the radial confines of the surface 20 by virtue of the provision of a forwardly and outwardly diverging annular flange 23 formed on the rim of the section 12. A pair of thrust rings 24 and 25 of generally triangular cross-sectional configuration are disposed on opposite sides of the flange 23 and these thrust rings, in combination with the flange are confined within an annular enclosure afforded by a cup-shaped clamping ring 26 which seats against a recessed flange 27 and is clamped thereagainst by a series of clamping bolts 28. As will be set forth in greater detail presently, the gasket assembly 10 includes a resilient gasket structure 30 and a metallic spreader and reinforcing ring 31. The gasket structure as shown in Figs. 1 to 5, inclusive, is a hollow unit of V-shape in radial cross-section which fits snugly within the groove 22 with its outer peripheral edge extending into the crevice or space existing between the surfaces 20 and 21 and bearing radially outwardly against the thrust ring 24. The metal spreader and reinforcing ring 31 is disposed within the resilient gasket structure 30 and the nature of which likewise will be made clear presently.

Referring now to Figs. 2 and 4, the structure of the gasket element 30 is generally triangular in radial cross-section, it being of V-shaped configuration and having inwardly diverging side walls 32 and 33 of appreciable thickness which meet in an outer circumferential apex region 34, the outer rim or edge of which presents a blunt cylindrical surface 35. The inner edges 36 of the side walls 32 and 33 are cylindrical and lie on a common imaginary cylinder coaxial with the axis of the gasket. The gasket structure 30 is formed of a suitable resilient elastomeric material such as rubber, either natural or synthetic, or of a rubber substitute, possessing the property of returning to its natural form after deformation thereof. Where the gasket assembly is used in an installation wherein the fluid passing through the joint is of a corrosive nature, the elastomeric material of the gasket 30 may be formed of a resilient rubber substitute such as Buna rubber or a suitable plastic material which will withstand the chemical attack of such fluid.

The spreader and reinforcing ring 31 is formed of metal, preferably stainless steel and it is generally of V-shape in radial cross-section. The two inwardly diverging sides 37 and 38 thereof are provided with laterally extending flanges 39 of small extent and the two sides 37 and 38 join at a relatively sharp apex region 40. The ring is split as at 29 radially and, in the free state, the ring is expanded slightly as shown in Fig. 3 so that the split ends thereof are separated.

As shown in Fig. 1, the ring 31 is disposed within the elastomeric ring 30 with the sides 37 and 38 bearing coextensively against the inside contact faces of the sides 32 and 33, respectively, and with the apex 40 projecting into the bottom region of the groove which exists by virtue of the disposition of the diverging sides 32 and 33. The lateral flanges 39 fit against the aligned surfaces 36.

As shown in Figs. 4 and 5, the angle of divergence between the sides 32 and 33 of the elastomeric gasket 30 is slightly less than the angle of divergence between the sides 37 and 38 of the metallic reinforcing ring 31. These angles have been designated at O and O', respectively. It has been found that in most installations involving a wide variety of uses, the angle O may be approximately 60° while the angle O' may be approximately 70°, thus resulting in a 10° difference in the overall divergence of legs and in a 5° normal difference in the angularity of the face angles of the interengaging surfaces. It will be understood that the angles involved, i.e. the angles O and O' will be a function of the angularity between the inclined sealing surfaces 20 and 21 of the particular joint which constitutes the environment for the sealing gasket assembly 10.

When the metallic reinforcing ring 31 is operatively disposed within the elastomeric sealing gasket 30, it exerts a circumferential "stretching" effect on the gasket which, as a consequence, exerts radially outwardly directed pressure on the gasket at all circumferential points therearound. This outward pressure forces the blunt apex 35 into the void existing between the two sealing surfaces 20 and 21 and against the thrust ring 24. The 5° differential between the contacting sealing surfaces of the sides 32, 37 and 33, 38 respectively, serves to spread the sides 32 and 33 outwardly so that the outside sealing surfaces thereof are at all times in intimate sealing contact with the inwardly presented opposed sealing surfaces 20 and 21, regardless of the degree of internal fluid pressure existing within the joint. As the degree of internal fluid pressure increases, the spreading action of the metallic ring 31 is enhanced, with the spreading action taking place in three directions, namely in a circumferential direction, a radial direction and in lateral directions.

The two separately manufactured parts 30 and 31 are capable of being easily assembled and disassembled. Since the internal ring 31 is split radially at 29, it may readily be distorted by moving the aligned ends of the ring out of register so that the ring may be shrunk and caused to enter the central opening through the elastomeric sealing gasket 30. Thereafter the ends of the ring 31 may again be brought into alignment so that the ring will nest snugly within the gasket 30. In the natural or free state of the assembled gasket 10, the ends of the ring 31 at the radial split 29 remain slightly spaced from each other. However, in use, particularly under conditions of high internal fluid pressure, these ends may separate to increase the spaced relation of the ends.

Referring now to the modified embodiment shown in Figs. 6, 7 and 8 of the drawings: The modified gasket assembly shown in these figures comprises a resilient composite gasket structure designated as a whole by reference numeral 41, outer wearing faces 42—43 therefor and a metallic spreader and reinforcing ring 44.

The resilient portion 41 of the gasket assembly comprises a pair of identical frusto-conical rings 41a—41a which are provided near their outer perimeters with complementary flat faces 45—45. These faces are normally positioned in contact with each other as shown in Fig. 8 so as to define as a whole a generally V-shaped structure having diverging side walls 46—46. The facing rings 42—43 are secured to the outer faces of the side walls 46—46 of the resilient gasket element. These facings are preferably non-compressible. They may be made of Teflon or other suitable heat resisting plastic material or of thin non-corroding metal. The said facing rings may be secured to the rubber side walls 46—46 by bonding or by interlocking engagement, for example, by an interlocking rib and groove construction shown at 47. This interlocking construction includes a series of radially extending grooves 48 formed in the rubber side walls 46—46 and cooperating ribs 49 formed on the inner face of the facing rings 42—43 so as to project into said grooves and thereby hold the interlocked elements from moving relative to each other.

The metallic spreader and reinforcing ring 44 is in the form of a truncated V-section so as to provide a generally V-shaped ring having a blunt outer perimeter 50. In other respects it may be formed the same as the ring shown in Fig. 5 with its side walls 51—52 diverging inwardly at angles somewhat greater than the angle of inclination of the inner faces of the side walls 46—46. As a consequence, when the gasket assembly is applied in a conduit coupling such as shown in Fig. 1, the side walls 51—52 of the reinforcing ring exert lateral pressure against the side walls 46—46 of the resilient gasket element so as to press the facing rings 42—43 firmly against the adjacent walls of the coupling element. Also, the said ring 44 is provided with lateral flanges 53—53 which seat on the inner perimeter 40a of the resilient rings 41a—41a. The ring 44 is normally formed of slightly larger diameter than the co-engaging portions of the resilient gasket element and is split as indicated at 54 so that it has a tendency to expand circumferentially, and thereby exert circumferential pressure against the inner perimeter of the side walls 46—46 and thereby press the apex 56 of the assembled side walls toward the apex of the recess formed by the spaced apart portions 20—21 of the joint structure. The blunt end 50 of the reinforcing ring 44 stops short of the bottom of the V-shaped cavity formed by the side walls 46—46 and thereby provides a pressure chamber 57. The inner face of the said side walls 46—46 of the gasket element are formed with relatively flexible annular flanges extending into the pressure chamber 57 and function as self-sealing lips 58—58 to prevent the escape of fluid entering the pressure chamber 57 through the split portion 54 of the ring 44. The fluid entering the chamber 57 exerts lateral pressure against the inclined faces 59—59 of the said lips 58 so as to press them into self-sealing engagement with each other and thereby prevent escape of steam along the complementary faces 45—45 of the resilient conical rings 41a—41a.

I claim:

1. A flexible gasket assembly comprising in combination a sealing ring structure of elastomeric material which is provided with inwardly diverging side walls presenting outwardly facing frusto-conical sealing surfaces, inwardly facing frusto-conical contact faces, and a peripheral region which presents a narrow blunt outwardly facing annular cylindrical surface, and a metallic spreader and reinforcing ring of generally V-shape in radial cross section disposed within said sealing ring structure and having side walls diverging inwardly at an angle of divergence at least as great as the angle of divergence of the side walls of the sealing ring structure and presenting outwardly facing frusto-conical contact faces in face-to-face contact with the contact faces of the sealing ring structure, the said spreader and reinforcing ring being also split radially to provide a pair of normally spaced apart opposed ends, whereby the overall diameter of the spreader and reinforcing ring, in its free state, is slightly greater than the internal overall diameter of the sealing ring structure and thereby exerts both lateral and circumferential spreading action on the sealing ring structure.

2. A flexible gasket assembly as set forth in claim 1 wherein the angle of divergence between the diverging side walls of the spreader and reinforcing ring is slightly greater than the angle of divergence between the side walls of the sealing ring structure.

3. A flexible gasket assembly as set forth in claim 2 wherein the angle of divergence between the diverging side walls of the spreader and reinforcing ring is approximately 70° and wherein the angle of divergence between the diverging side walls of the sealing ring structure is approximately 60°.

4. A flexible gasket assembly comprising in combination an outer sealing ring structure of elastomeric material which is V-shape in radial cross-section and is provided with inwardly diverging side walls presenting outwardly facing frusto-conical sealing surfaces and inwardly facing frusto-conical contact faces, and a metallic spreader and reinforcing ring formed of spring material, said metallic ring being generally of V-shape in radial cross-section and having inwardly diverging side walls presenting outwardly facing frusto-conical contact faces, said metallic ring being disposed concentrically within said sealing ring with said outwardly facing contact faces in face-to-face engagement with said inwardly facing contact faces of the sealing ring, the side walls of said metallic ring having laterally extending flanges formed on their inner peripheral edges, said flanges being nested within the inner peripheral edges of the side walls of the sealing ring structure in face-to-face contact therewith.

5. A flexible gasket assembly according to claim 4 wherein the sealing ring structure comprises separate resilient gasket ring elements fitted to the opposite contact faces of said spreader and reinforcing ring.

6. A flexible gasket assembly as defined in claim 5 wherein the outer marginal portions of the separate gasket ring elements comprise flat faces which resiliently abut against each other when the several parts of the gasket assembly are in their assembled operative relation to each other.

7. A flexible gasket assembly as defined in claim 6 wherein the spreader and reinforcing ring is formed with a blunt outer perimeter which stops short of the bottom of a channel formed by the divergence of the resilient gasket ring elements and cooperates therewith to define a fluid pressure chamber, and wherein the said gasket ring elements are formed with opposed flexible flanges having complementary inner faces and extend into said pressure chamber and defining pressure activated self-sealing elements.

8. A flexible gasket assembly as defined in claim 6 provided additionally with compression resistant wearing faces secured to the outer surfaces of the resilient seal ring structure.

9. A flexible gasket assembly as defined in claim 8 wherein said wearing faces are removably interlocked with the outer surfaces of the resilient seal ring structure.

10. A flexible gasket assembly according to claim 9 wherein the said wearing faces are provided with portions penetrating the outer surfaces of the resilient seal ring structure.

References Cited in the file of this patent

UNITED STATES PATENTS

| | | |
|---|---|---|
| 1,485,252 | Denis | Feb. 26, 1924 |
| 1,802,177 | Knight | Apr. 21, 1931 |
| 1,931,922 | Damsel et al. | Oct. 24, 1933 |
| 2,250,199 | Kelly | July 22, 1941 |
| 2,366,161 | Tweedale | Jan. 2, 1945 |
| 2,512,883 | Warren | June 27, 1950 |

FOREIGN PATENTS

| | | |
|---|---|---|
| 758,447 | Great Britain | Oct. 3, 1956 |